(12) United States Patent
Yang et al.

(10) Patent No.: US 7,712,755 B2
(45) Date of Patent: May 11, 2010

(54) EXTENDING AND RETRACTING DEVICE FOR VEHICLE STEP

(75) Inventors: Huizhong Yang, Hangzhou (CN);
Zhaobo Qing, Hangzhou (CN)

(73) Assignee: T-Max (Hangzhou) Industrial Co., Ltd. (CN)

( * ) Notice: Subject to any disclaimer, the term of this patent is extended or adjusted under 35 U.S.C. 154(b) by 111 days.

(21) Appl. No.: 11/973,444

(22) Filed: Oct. 9, 2007

(65) Prior Publication Data
US 2008/0191445 A1    Aug. 14, 2008

(30) Foreign Application Priority Data
Feb. 14, 2007    (CN)    .................... 2007 1 0067264

(51) Int. Cl.
*B60R 3/00*    (2006.01)
(52) U.S. Cl. .................. 280/163; 280/164.1; 280/164.2
(58) Field of Classification Search .................. 280/166, 280/163, 164.1, 164.2; 182/81, 127, 88; 248/281.11, 278, 1, 286.1
See application file for complete search history.

(56) References Cited

U.S. PATENT DOCUMENTS

| | | | | |
|---|---|---|---|---|
| 2,423,961 | A * | 7/1947 | Buxton | 223/95 |
| 2,764,422 | A * | 9/1956 | McDonald | 182/91 |
| 3,494,634 | A * | 2/1970 | Paula | 280/166 |
| 4,116,457 | A * | 9/1978 | Nerem et al. | 280/166 |
| 4,982,974 | A * | 1/1991 | Guidry | 280/164.2 |
| 5,842,709 | A * | 12/1998 | Maccabee | 280/166 |
| 6,027,090 | A * | 2/2000 | Liu | 248/281.11 |
| 6,641,158 | B2 | 11/2003 | Leitner | 280/166 |
| 6,830,257 | B2 | 12/2004 | Leitner | 280/166 |
| 6,834,875 | B2 | 12/2004 | Leitner et al. | 280/166 |
| 6,926,295 | B2 * | 8/2005 | Berkebile et al. | 280/166 |
| 6,938,909 | B2 | 9/2005 | Leitner | 280/166 |
| 6,942,233 | B2 | 9/2005 | Leitner et al. | 280/166 |
| 7,007,961 | B2 | 3/2006 | Leitner et al. | 280/166 |
| 7,055,839 | B2 | 6/2006 | Leitner | 280/166 |
| 7,118,120 | B2 | 10/2006 | Lee et al. | 280/166 |
| 7,163,221 | B2 | 1/2007 | Leitner | 280/166 |
| 7,287,771 | B2 * | 10/2007 | Lee et al. | 280/166 |
| 7,441,790 | B2 * | 10/2008 | Lechkun | 280/166 |
| 2005/0151340 | A1 | 7/2005 | Leitner | 280/166 |
| 2006/0091638 | A1 | 5/2006 | Leitner et al. | 280/166 |
| 2006/0125204 | A1 | 6/2006 | Leitner et al. | 280/166 |

(Continued)

FOREIGN PATENT DOCUMENTS

CA    2438489 A    10/2002

(Continued)

*Primary Examiner*—Hau V Phan
(74) *Attorney, Agent, or Firm*—Bliss McGlynn, P.C.

(57) ABSTRACT

An extending and retracting device for a vehicle step includes a mounting bracket adapted to be fixed to a body of a vehicle and a step bracket. An arc sliding member is fixed to the step bracket. A driving arm defines a pair of ends thereof pivotally connected to the mounting bracket and step bracket, respectively. A supporting arm defines an upper end portion thereof pivotally connected to the mounting bracket and a lower end portion of the supporting arm defining at least one arc slot of the lower end portion. The arc sliding member is adapted to fit into the arc slot so as to be slidable in the arc slot such that the lower end portion of the supporting arm is slidably connected to the step bracket.

8 Claims, 6 Drawing Sheets

U.S. PATENT DOCUMENTS

2006/0202441 A1 9/2006 Leitner .................... 280/166
2007/0108720 A1 5/2007 Leitner .................... 280/166

FOREIGN PATENT DOCUMENTS

| | | | |
|---|---|---|---|
| CA | 2463717 | A | 5/2003 |
| CA | 2475492 | A | 1/2005 |
| CN | 1652955 | A | 8/2005 |
| CN | 101020434 | A | 8/2007 |
| JP | 8-132967 | A | 5/1996 |
| WO | WO02/085670 | A2 | 10/2002 |
| WO | WO 03/039910 | | 5/2003 |

* cited by examiner

US 7,712,755 B2

EXTENDING AND RETRACTING DEVICE FOR VEHICLE STEP

BACKGROUND OF THE INVENTION

1. Field of the Invention

The present invention relates, generally, to a vehicle body and, more particularly, to an extending and retracting device for a step of the vehicle body.

2. Description of the Related Art

With improvement of living standards, there are increased demands for comfortability of vehicles, such as cars. The step under a door of a vehicle is the only way to get on or off the vehicle. However, it is difficult to meet the trafficability and convenience requirements simultaneously when mounting the vehicle step. Considering trafficability of the vehicle, the level of the vehicle step should be higher than the ground clearance of the vehicle. In terms of ergonomics, the vehicle step is generally mounted at a level of 15 cm with respect to the ground so that it is convenient for a passenger of the vehicle to get on or off it, but this level cannot meet the trafficability requirements of most vehicles.

In view of this problem, retractable vehicle-step devices for use with automotive vehicles have been developed in the related art. The extending and retracting device of such known retractable vehicle-step devices typically employs a four-link mechanism. When the vehicle door is opened, the vehicle step is automatically extended out downwardly from the chassis of the vehicle near the board of the body of the vehicle so that a passenger can step on the extended vehicle step. When the vehicle door is closed, the vehicle step is automatically retracted upwardly to its original position, thus not affecting disadvantageously the trafficability of the vehicle.

Chinese Patent Application CN1652955, the description of which is incorporated herein by reference, also discloses such a retractable vehicle-step apparatus that employs an extending and retracting device in the form of a four-link mechanism. However, this extending and retracting device suffers from at least two disadvantages. First, the distance between two pivot shafts connecting the four-link mechanism and the vehicle step is short so that stress tends to concentrate on the pivot shafts' position when a passenger steps on the extended vehicle step. Thus, the pivot shafts tend to be destroyed over time due to their lack of mechanical strength. Therefore, reliability is reduced, and cost is increased. Second, the retractable vehicle-step apparatus employs a buffering structure in the form of a stopping block, thus increasing the complexity of the apparatus.

Thus, there is a need in the related art for an extending and retracting device for a vehicle step having increased reliability and reduced cost and complexity. More specifically, there is a need in the related art for a vehicle-step device in which stress is distributed evenly and that includes a buffering structure that is mechanically simple and cost-effective to manufacture.

SUMMARY OF THE INVENTION

The present invention overcomes the disadvantages in the related art in an extending and retracting device for a vehicle step. The device includes a mounting bracket adapted to be fixed to a body of a vehicle and a step bracket. An arc sliding member is fixed to the step bracket. A driving arm defines a pair of ends thereof pivotally connected to the mounting bracket and step bracket, respectively. A supporting arm defines an upper end portion thereof pivotally connected to the mounting bracket and a lower end portion of the supporting arm defining at least one arc slot of the lower end portion. The arc sliding member is adapted to fit into the arc slot so as to be slidable in the arc slot such that the lower end portion of the supporting arm is slidably connected to the step bracket.

One advantage of the extending and retracting device for a vehicle step of the present invention is that it provides increased reliability and reduced cost and structural complexity.

Another advantage of the extending and retracting device for a vehicle step of the present invention is that it distributes stress evenly with a buffering structure that is structurally simple.

Another advantage of the extending and retracting device for a vehicle step of the present invention is that it employs a cost-effective and efficient arc sliding member and arc slot to facilitate the extending and retracting action of the retractable vehicle-step apparatus of the related art.

Another advantage of the extending and retracting device for a vehicle step of the present invention is that end portions of the arc slot limit movement of the arc sliding member within the arc slot and buffer impact of the arc sliding member against the arc slot.

Another advantage of the extending and retracting device for a vehicle step of the present invention is that it produces an internal self-locking force that produces a balanced stage when the device is in its extended position.

Another advantage of the extending and retracting device for a vehicle step of the present invention is that the arc sliding member and arc slot eliminate stress concentration so that useful life of the device is long.

Another advantage of the extending and retracting device for a vehicle step of the present invention is that it is relatively lightweight.

Another advantage of the extending and retracting device for a vehicle step of the present invention is that it is more aesthetically pleasing than the extending and retracting devices known in the related art.

Other objects, features, and advantages of the present invention will be readily appreciated as the same becomes better understood while reading the subsequent description taken in conjunction with the accompanying drawings.

DETAILED DESCRIPTION OF THE INVENTION

Figure 1:
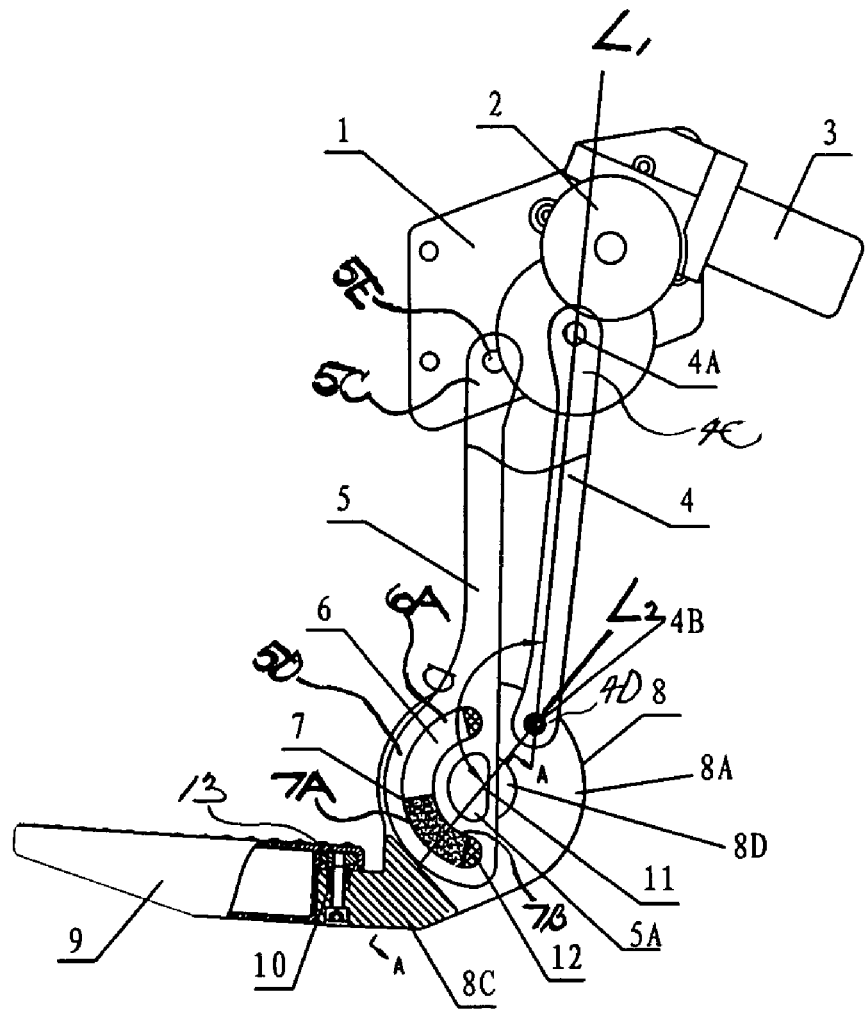
FIG. 1 is a schematic side view of a first embodiment of the extending and retracting device for a vehicle step of the present invention shown disposed in an extended position.

An extending and retracting device for a vehicle step according to the present invention is shown in FIGS. 1 through 12, where like numerals are used to designate like arc structure throughout various embodiments of the device disclosed herein. Although the device is designed to be used in connection with the known vehicle steps described above, those having ordinary skill in the related art should appreciate that the device can be used in connection with any suitable vehicle step.

The details of each embodiment of the device of the present invention are described below with reference to FIGS. 1-2 and 9, 3-4 and 10, 5-6 and 11, and 7-8 and 12, respectively. Throughout the figures, like structural elements of the corresponding various embodiments have like reference numerals with respect to each other.

Figure 2:
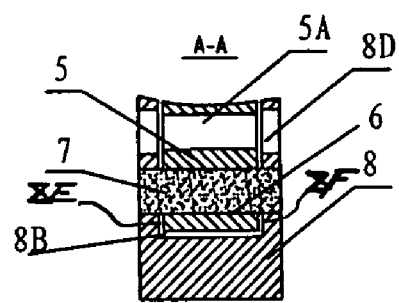
FIG. 2 is a sectional view of a part of the first embodiment of the extending and retracting device for a vehicle step of the present invention taken along line "A-A" of FIG. 1.
Figure 9:
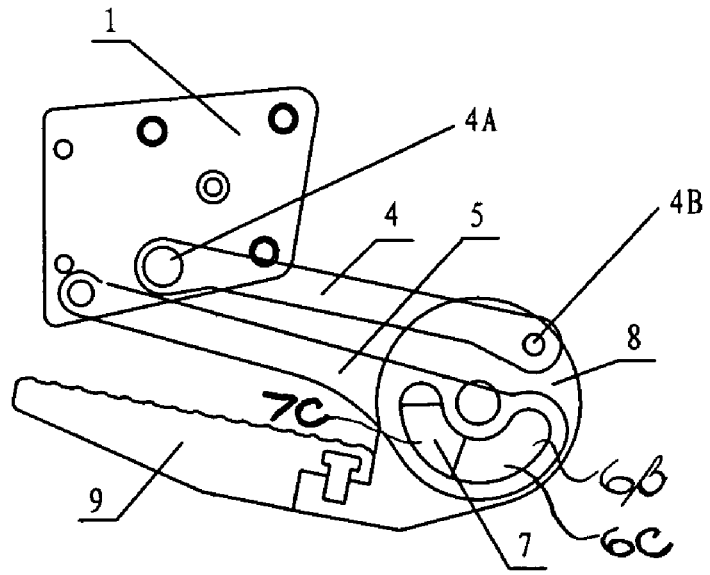
FIG. 9 is a schematic side view of the first embodiment of the extending and retracting device for a vehicle step of the present invention illustrated in FIG. 1 shown disposed in a retracted position.

With reference to FIGS. 1-2 and 9, the first embodiment of the device of the present invention will now be described. In general, this embodiment of the device includes a mounting bracket 1 adapted to be fixed to a body of a vehicle (not shown) and a step bracket 8. An arc sliding member 7 is fixed to the step bracket 8. A driving arm 4 defines a pair of ends 4C, 4D of the driving arm 4 pivotally connected to the mounting bracket 1 and step bracket 8, respectively. A supporting arm 5 defines an upper end portion 5C of the supporting arm 5 pivotally connected to the mounting bracket 1 and a lower end portion 5D of the supporting arm 5 defining at least one arc slot 6 of the lower end portion 5D. The arc sliding member 7 is adapted to fit into the arc slot 6 so as to be slidable in the arc slot 6 such that the lower end portion 5D of the supporting arm 5 is slidably connected to the step bracket 8.

More specifically, the step bracket 8 includes a body portion 8A and an extension portion 8C extending from a lower part of the body portion 8A. The arc sliding member 7 is mounted to the body portion 8A. The ends 4C, 4D of the driving arm 4 are pivotally connected to the mounting bracket 1 and the body portion 8A of the step bracket 8, respectively, via, for example, corresponding pivot shafts 4A, 4B. The upper end portion 5C of the supporting arm 5 is pivotally connected to the mounting bracket 1 via, for example, a pivot shaft 5E. In one aspect of this embodiment, the arc slot 6 extends through the lower end portion 5D of the supporting arm 5. The lower end portion 5D is slidably connected to the body portion 8A of the step bracket 8.

In particular, the driving arm 4 is formed in the shape of a rod-like structure, the lower end portion 5D of the supporting arm 5 is formed as an arc structure 5D, which, in turn, is formed with a substantially fan-shaped through-hole 5A near a substantially circular center of the arc structure 5D, and the arc slot 6 is formed outside of the through-hole 5A. The body portion 8A of the step bracket 8 is formed as a columnar structure 8A, and a substantially U-shaped groove 8B is formed in the columnar structure 8A in the radial direction, as shown in FIG. 2. The columnar structure 8A is formed with a center hole 8D.

As shown in FIG. 2, the lower end portion 5D of the supporting arm 5 is located in the groove 8B of the step bracket 8, and a pair of ends 7A, 7B of the arc sliding member 7 are fixed in a respective pair of side walls 8E, 8F of the groove 8B. In this way, the arc sliding member 7 passes through the arc slot 6 of the supporting arm 5 and can slide in the arc slot 6 by a predetermined distance. As such, the supporting arm 5 and the body portion 8A of the step bracket 8 are slidably connected to each other.

A curvature center 11 of the arc slot 6 substantially coincides with a curvature center of the arc structure 5D of the supporting arm 5 and a substantially circular center of the columnar structure 8A of the step bracket 8, and the arc structure 5D is connected to a rod-like structure of the supporting arm 5 by a transition arc. In addition, the columnar structure 8A of the step bracket 8 is sized to match the arc structure 5D of the supporting arm 5 so that mechanical property and appearance are pleasing.

In particular, the arc sliding member 7 may be formed as a sliding block 7. However, those having ordinary skill in the related art should appreciate that the arc sliding member 7 may be formed as, for example, a plurality of columnar bodies arranged in an arc array 7. With reference to FIG. 2, as described above, the arc sliding member 7 passes through the arc slot 6, and the ends 7A, 7B of the arc sliding member 7 are fixed in the respective side walls 8E, 8F of the groove 8B of the step bracket 8. The arc slot 6 is longer than the arc sliding member 7 so that the arc sliding member 7 is ensured to slide in the arc slot 6 by a predetermined distance.

The arc slot 6 defines an upper end 6A, shown in FIG. 1, and a lower end 6B, shown in FIG. 9, of the arc slot 6. In order to reduce impact of the arc sliding member 7 on the arc slot 6, a curvature radius of each end 6A, 6B of the arc slot 6 is smaller than that of an intermediate portion 6C of the arc slot 6 defined between the upper and lower ends 6A, 6B. However, those having ordinary skill in the related art should appreciate that the curvature radius of the arc slot 6 may be substantially uniform. In this instance, in order to reduce impact of the arc sliding member 7 on the arc slot 6, at least one buffering pad 12 can be disposed at either of the ends 6A, 6B of the arc slot 6. FIG. 1 shows a pair of buffering pads 12 disposed at the respective ends 6A, 6B of the arc slot 6.

The extension portion 8C of the step bracket 8 is formed with a step groove 10, and a vehicle step 9 is placed on and covers the step groove 10 so that the vehicle step 9 is fixed to the extension portion 8C by a fastener, such as a screw 13, thereby forming the device of the present invention. When the vehicle step 9 and, thus, device are in an extended position, the arc sliding member 7 is located in the arc slot 6 substantially at or adjacent to the lower end 6B of the arc slot 6, as shown in FIG. 1. When the vehicle step 9 and, thus, device are in a retracted position, the arc sliding member 7 is located in the arc slot 6 substantially at or adjacent to the upper end 6A of the arc slot 6, as shown in FIG. 9.

As shown in FIG. 1, the arc slot 6 and the curvature center 11 of the arc slot 6 are located to the same side (shown to the left side in FIG. 1) of imaginary line "$L_1$" connecting with each other a pair of pivot points of the respective pivot shafts 4A, 4B of said driving arm 4. Therefore, when the vehicle step 9 is extended and/or a passenger steps on the vehicle step 9, the device of the present invention can achieve self-locking easily. When the vehicle step 9 is extended, the angle "α" between imaginary line "$L_1$" and imaginary line "$L_2$" connecting the pivot point of the pivot shaft 4B with the curvature center 11 of the arc slot 6 may be within the range of 150° to 175°, such as 165°.

It should be appreciated by those having ordinary skill in the related art that the first embodiment of the device of the present invention can have any suitable shape, size, and structure and structural relationship with each of the vehicle body and vehicle step 9. More specifically, it should be so appreciated that the mounting bracket 1 can be fixed to the vehicle body in any suitable manner and the extension portion 8C of the step bracket 8 can be fixed to the vehicle step 9 in any suitable manner. It should be so appreciated also that each of the mounting bracket 1, step bracket 8, arc sliding member 7, driving arm 4, and supporting arm 5 can have any suitable shape, size, and structure and structural relationship with each other. It should be so appreciated also that each of the arc slot 6; groove 8B, center hole 8D, and circular center of the columnar structure 8A; curvature center 11 of the arc slot 6; through-hole 5A, circular center, and curvature center of the arc structure 5D; and transition arc of the supporting arm 5 can have any suitable shape and size and structural relationship with the device. It should be so appreciated also that the length differential between the arc slot 6 and arc sliding member 7 can be any suitable length. It should be so appreciated also that the curvature radius of the arc slot 6 may be any suitable length. It should be so appreciated also that when the vehicle step 9 is extended, the angle "α" between imaginary lines "$L_1$" and "$L_2$" can be any suitable angle.

Figure 3:
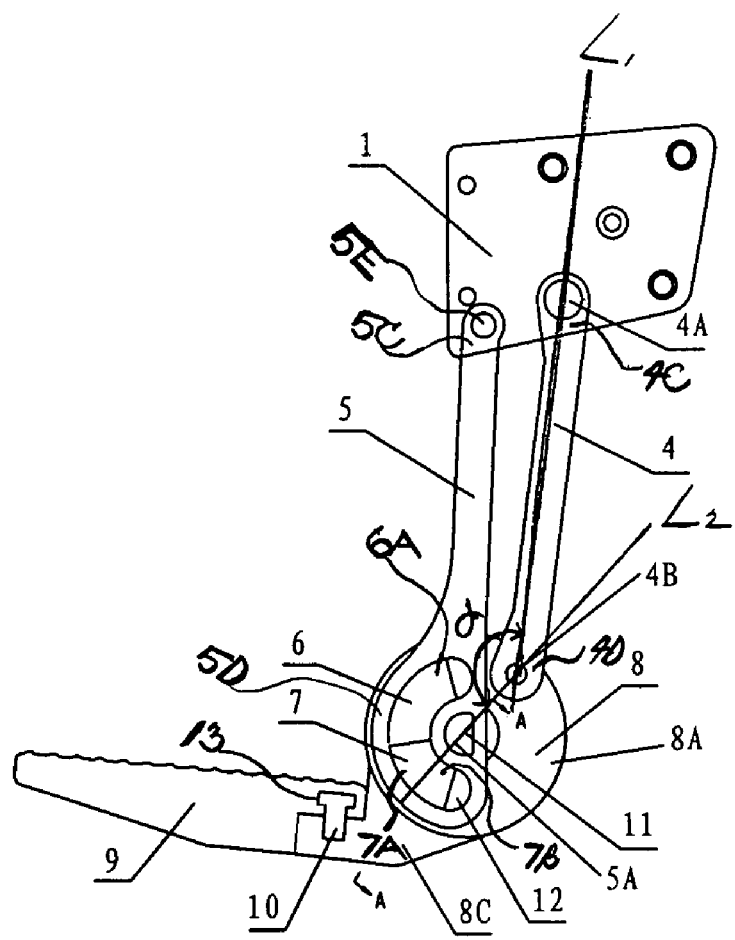
FIG. 3 is a schematic side view of a second embodiment of the extending and retracting device for a vehicle step of the present invention shown disposed in an extended position.
Figure 4:
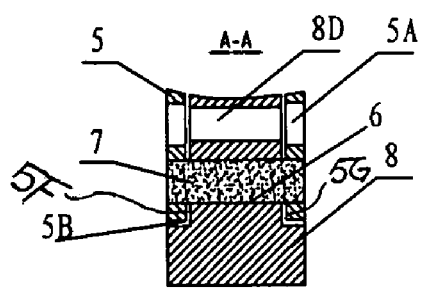
FIG. 4 is a sectional view of a part of the second embodiment of the extending and retracting device for a vehicle step of the present invention taken along line "A-A" of FIG. 3.
Figure 10:
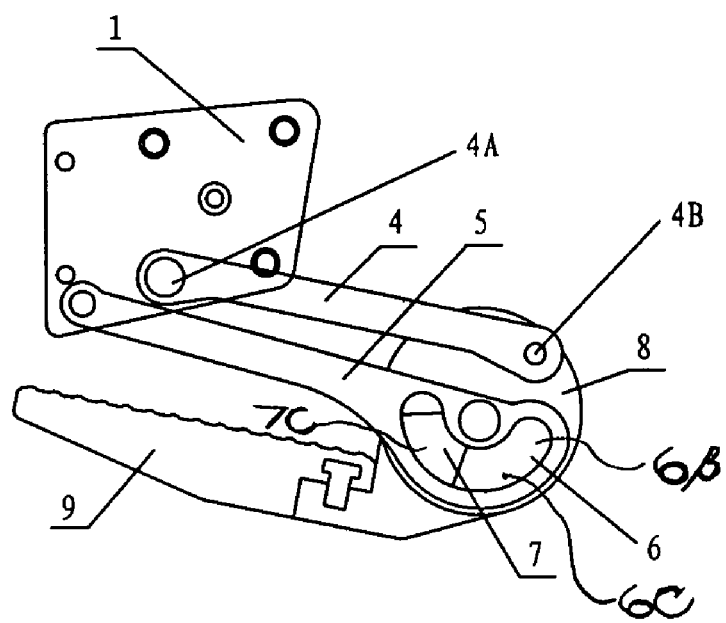
FIG. 10 is a schematic side view of the second embodiment of the extending and retracting device for a vehicle step of the present invention illustrated in FIG. 3 shown disposed in a retracted position.

With reference to FIGS. 3-4 and 10, the second embodiment of the device of the present invention will now be described. In general, this embodiment of the device includes a mounting bracket 1 adapted to be fixed to a body of a vehicle (not shown), a step bracket 8, an arc sliding member 7, a driving arm 4, and a supporting arm 5.

More specifically, the step bracket 8 includes a body portion 8A and an extension portion 8C extending from a lower part of the body portion 8A, and the vehicle step 9 is connected to and mounted on the extension portion 8C. The driving arm 4 defines a pair of ends 4C, 4D of the driving arm 4 pivotally connected to the mounting bracket 1 and the body portion 8A of the step bracket 8, respectively, via, for example, corresponding pivot shafts 4A, 4B. An upper end portion 5C of the supporting arm 5 is pivotally connected to the mounting bracket 1 via, for example, a pivot shaft 5E, and a lower end portion 5D of the supporting arm 5 is formed with at least one arc slot 6. In one aspect of this embodiment, the arc slot 6 extends through the lower end portion 5D. The arc sliding member 7 is fitted into each arc slot 6 so as to be slidable in the arc slot 6 such that the lower end portion 5D of the supporting arm 5 is slidably connected to the body portion 8A of the step bracket 8.

In particular, the driving arm 4 is formed in the shape of a rod-like structure, and the lower end portion 5D of the supporting arm 5 is formed as an arc structure 5D, which is formed with a substantially fan-shaped through-hole 5A near a substantially circular center of the arc structure 5D. The body portion 8A of the step bracket 8 is formed as a columnar structure 8A, and the columnar structure 8A is formed with a substantially center hole 8D.

A substantially U-shaped groove 5B is formed in the lower end portion 5D of the supporting arm 5, and a lower tip end of the groove 5B is substantially semi-circular. Each of a pair of side walls 5F, 5G of the groove 5B is formed with each arc slot 6, a curvature center 11 of each arc slot 6 coincides with a curvature center of the arc structure 5D and a substantially circular center of the columnar structure 8A of the step bracket 8, and the arc structure 5D is connected to a rod-like structure of the supporting arm 5 by a transition arc.

In particular, the arc sliding member 7 may be formed as a sliding block 7. However, those having ordinary skill in the related art should appreciate that the arc sliding member 7 may be formed as, for example, a plurality of columnar bodies arranged in an arc array 7. The arc sliding member 7 substantially transversely passes through the body portion 8A of the step bracket 8, and a pair of ends 7A, 7B of the arc sliding member 7 are extended into each arc slot 6. The arc of the arc slot 6 is longer than that of the arc sliding member 7. More particularly, an intermediate portion 7C of the arc sliding member 7 is fixed in the step bracket 8, and the ends 7A, 7B of the arc sliding member 7 are extended substantially transversely into a pair of arc slots 6 formed in the respective side walls 5F, 5G of the groove 5B. A part of the body portion 8A located in the groove 5B may be thinner than remaining parts of the body portion 8A. Therefore, when that part of the body portion 8A is located in the groove 5B, a pair of exterior sides of the lower end portion 5D of the supporting arm 5 are substantially flush with a respective pair of exterior sides of those remaining parts of the body portion 8A, as shown in FIG. 4.

Each arc slot 6 defines an upper end 6A, shown in FIG. 3, and a lower end 6B, shown in FIG. 10, of the arc slot 6. In order to reduce impact of the arc sliding member 7 on each arc slot 6, a curvature radius of each end 6A, 6B of the arc slot 6 is smaller than that of an intermediate portion 6C of the arc slot 6 defined between the upper and lower ends 6A, 6B. However, those having ordinary skill in the related art should appreciate that the curvature radius of each arc slot 6 may be substantially uniform. In this instance, in order to reduce impact of the arc sliding member 7 on the arc slot 6, at least one buffering pad 12 can be disposed at either of the ends 6A, 6B of the arc slot 6. FIG. 3 shows a pair of buffering pads 12 disposed at the respective ends 6A, 6B of an arc slot 6.

The extension portion 8C of the step bracket 8 is formed with a step groove 10, and a vehicle step 9 is placed on and covers the step groove 10 so that the vehicle step 9 is fixed to the extension portion 8C by a fastener, such as a screw 13, thereby forming the device of the present invention. When the vehicle step 9 and, thus, device are in an extended position, the arc sliding member 7 is located in the arc slot 6 substantially at or adjacent to the lower end 6B of the arc slot 6, as shown in FIG. 3. When the vehicle step 9 and, thus, device are in a retracted position, the arc sliding member 7 is located in the arc slot 6 substantially at or adjacent to the upper end 6A of the arc slot 6, as shown in FIG. 10.

As shown in FIG. 3, each arc slot 6 and the curvature center 11 of the arc slot 6 are located to the same side (shown to the left side in FIG. 3) of imaginary line "$L_1$" connecting with each other a pair of pivot points of the respective pivot shafts 4A, 4B of said driving arm 4. When the vehicle step 9 is extended, the angle "α" between imaginary line "$L_1$" and imaginary line "$L_2$" connecting the pivot point of the pivot shaft 4B with the curvature center 11 of the arc slot 6 may be within the range of 150° to 175°, such as 165°.

The second embodiment of the device of the present invention differs from the first embodiment of the device of the present invention in the following main aspects. In the second embodiment, the lower end portion 5D of the supporting arm 5 is formed with the groove 5B, a part of the body portion 8A of the step bracket 8 is located in the groove 5B, the arc sliding member 7 passes through the body portion 8A of the step bracket 8, the intermediate portion 7C of the arc sliding member 7 is fixed in the body portion 8A, and the ends 7A, 7B of the arc sliding member 7 are extended into the arc slots 6 formed in the respective side walls 5F, 5G of the groove 5B. However, in the first embodiment, the body portion 8A of the step bracket 8 is formed with the groove 8B, the lower end portion 5D of the supporting arm 5 is located in the groove 8B, the arc sliding member 7 passes through the arc slot 6 formed in the lower end portion 5D of the supporting arm 5, and the ends 7A, 7B of the arc sliding member 7 are fixed in the respective side walls 8E, 8F of the groove 8B.

It should be appreciated by those having ordinary skill in the related art that the second embodiment of the device of the present invention can have any suitable shape, size, and structure and structural relationship with each of the vehicle body and vehicle step 9. More specifically, it should be so appreciated that the mounting bracket 1 can be fixed to the vehicle body in any suitable manner and the extension portion 8C of the step bracket 8 can be fixed to the vehicle step 9 in any suitable manner. It should be so appreciated also that each of the mounting bracket 1, step bracket 8, arc sliding member 7, driving arm 4, and supporting arm 5 can have any suitable shape, size, and structure and structural relationship with each other. It should be so appreciated also that each of the arc slot 6; groove 5B; center hole 8D and circular center of the columnar structure 8A; curvature center 11 of the arc slot 6; through-hole 5A, circular center, and curvature center of the arc structure 5D; and transition arc of the supporting arm 5 can have any suitable shape and size and structural relationship with the device. It should be so appreciated also that the length differential between the arc slot 6 and arc sliding member 7 can be any suitable length. It should be so appreciated also that the curvature radius of the arc slot 6 may be any suitable length. It should be so appreciated also that when the vehicle step 9 is extended, the angle "α" between imaginary lines "$L_1$" and "$L_2$" can be any suitable angle.

Figure 5:
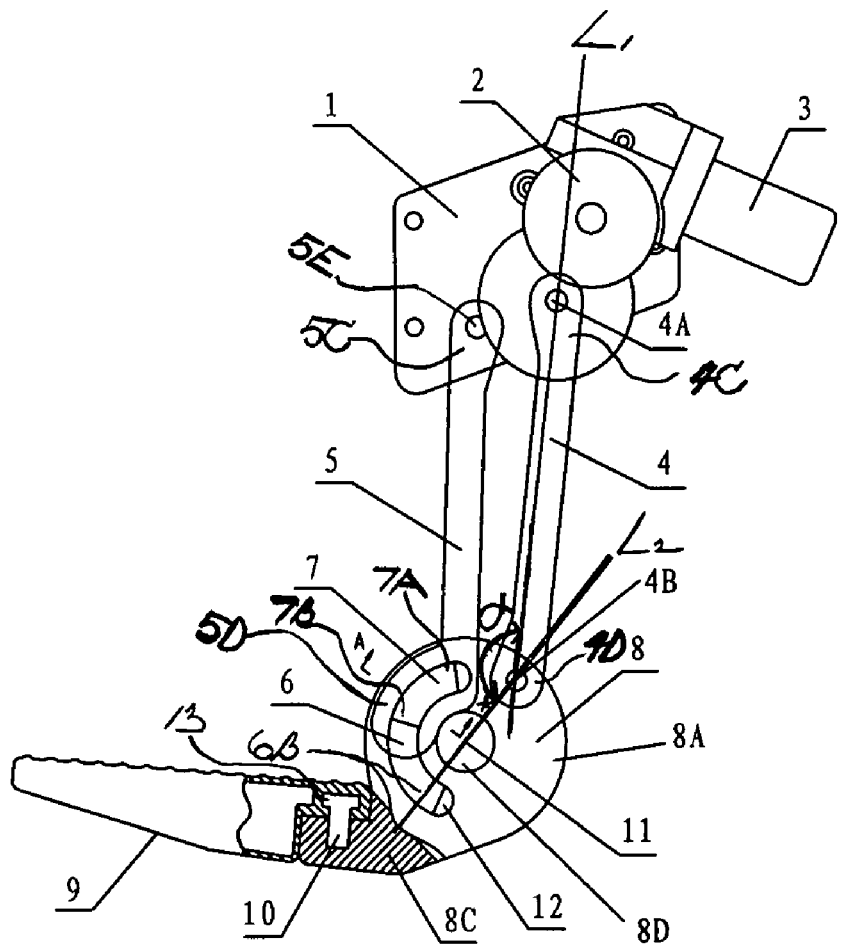
FIG. 5 is a schematic side view of a third embodiment of the extending and retracting device for a vehicle step of the present invention shown disposed in an extended position.
Figure 6:
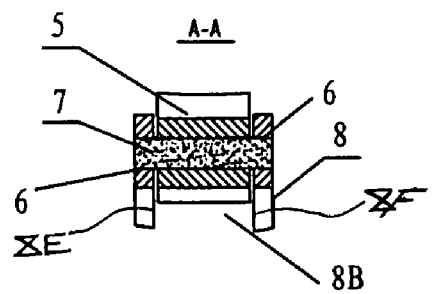
FIG. 6 is a sectional view of a part of the third embodiment of the extending and retracting device for a vehicle step of the present invention taken along line "A-A" of FIG. 5.
Figure 11:
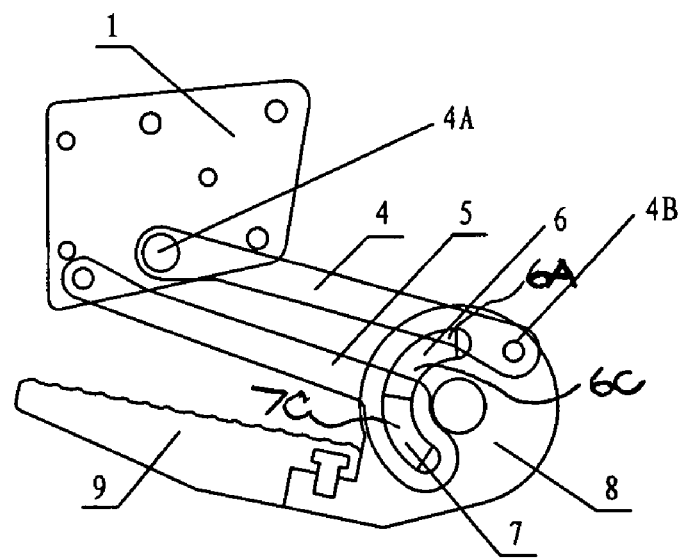
FIG. 11 is a schematic side view of the third embodiment of the extending and retracting device for a vehicle step of the present invention illustrated in FIG. 5 shown disposed in a retracted position.

With reference to FIGS. 5-6 and 11, the third embodiment of the device of the present invention will now be described. In general, this embodiment of the device includes a mounting bracket 1 adapted to be fixed to a body of a vehicle (not shown), a step bracket 8, an arc sliding member 7, a driving arm 4, and a supporting arm 5.

More specifically, the step bracket 8 includes a body portion 8A and an extension portion 8C extending from a lower part of the body portion 8A, and a vehicle step 9 is connected to and mounted on the extension portion 8C. The body portion 8A is formed with at least one arc slot 6.

A pair of ends 4C, 4D of the driving arm 4 are pivotally connected to the mounting bracket 1 and the body portion 8A of the step bracket 8, respectively, via, for example, corresponding pivot shafts 4A, 4B. An upper end portion 5C of the supporting arm 5 is pivotally connected to the mounting bracket 1 via a pivot shaft 5E.

The arc sliding member 7 is mounted to a lower end portion 5D of the supporting arm 5 and fitted into and slidable in each arc slot 6 so that the lower end portion 5D of the supporting arm 5 is slidably connected to the body portion 8A of the step bracket 8.

In particular, the driving arm 4 is formed in the shape of rod-like structure, and the lower end portion 5D of the supporting arm 5 is formed as an arc structure 5D. The body portion 8A of the step bracket 8 is formed as a columnar structure 8A, and a substantially U-shaped groove 8B is formed in the columnar structure 8A in the radial direction. The columnar structure 8A is formed with a center hole 8D.

As shown in FIG. 6, the lower end portion 5D of the supporting arm 5 is located in the groove 8B of the step bracket 8, and the arc sliding member 7 passes through the supporting arm 5. An intermediate portion 7C of the arc sliding member 7 is fixed in the supporting arm 5, and a pair of ends 7A, 7B of the arc sliding member 7 are extended into a respective pair of arc slots 6 formed in a corresponding pair of side walls 8E, 8F of the groove 8B so that the supporting arm 5 and the step bracket 8 are connected slidably to each other.

Each of the side walls 8E, 8F of the groove 8B is formed with each arc slot 6, which extends through the side walls 8E, 8F. A curvature center 11 of the arc slot 6 coincides with a substantially circular center of the columnar structure 8A of the step bracket 8.

In particular, the arc sliding member 7 may be formed as a sliding block 7. However, those having ordinary skill in the related art should appreciate that the arc sliding member 7 may be formed as, for example, a plurality of columnar bodies arranged in an arc array 7. The ends 7A, 7B of the arc sliding member 7 are extended into a respective pair of arc slots 6 formed in the corresponding side walls 8E, 8F of the groove 8B of the step bracket 8, and the intermediate portion 7C of the arc sliding member 7 is fixed in the lower end portion 5D of the supporting arm 5. The arc of the arc slot 6 is longer than that of the arc sliding member 7 so that the arc sliding member 7 can slide in the arc slots 6.

The arc slot 6 defines an upper end 6A, shown in FIG. 11, and a lower end 6B, shown in FIG. 5, of the arc slot 6. In order to reduce impact of the arc sliding member 7 on the arc slot 6, a curvature radius of each end 6A, 6B of the arc slot 6 is smaller than that of an intermediate portion 6C of the arc slot 6 defined between the upper and lower ends 6A, 6B. However, those having ordinary skill in the related art should appreciate that the curvature radius of the arc slot 6 may be substantially uniform. In this instance, in order to reduce impact of the arc sliding member 7 on the arc slot 6, at least one buffering pad 12 can be disposed at either of the ends 6A, 6B of the arc slot 6. FIG. 5 shows a pair of buffering pads 12 disposed at the respective ends 6A, 6B of the arc slot 6.

The extension portion 8C of the step bracket 8 is formed with a step groove 10, and a vehicle step 9 is placed on and covers the step groove 10 so that the vehicle step 9 is fixed to the extension portion 8C by a fastener, such as a screw 13, thereby forming the device of the present invention. When the vehicle step 9 and, thus, device are in an extended position, the arc sliding member 7 is located in the arc slot 6 substantially at or adjacent to the upper end 6A of the arc slot 6, as shown in FIG. 5. When the vehicle step 9 and, thus, device are in a retracted position, the arc sliding member 7 is located in the arc slot 6 substantially at or adjacent to the lower end 6B of the arc slot 6, as shown in FIG. 11.

As shown in FIG. 5, each arc slot 6 and the curvature center 11 of the arc slot 6 are located to the same side (shown to the left side in FIG. 5) of imaginary line "$L_1$" connecting with each other a pair of pivot points of the respective pivot shafts 4A, 4B of said driving arm 4. When the vehicle step 9 is extended, the angle "α" between imaginary line "$L_1$" and imaginary line "$L_2$" connecting the pivot point of the pivot shaft 4B with the curvature center 11 of the arc slot 6 may be within the range of 150° to 175°, such as 165°.

The third embodiment of the device of the present invention differs from the first and second embodiments of the device of the present invention in the following main aspects. In the third embodiment, the arc sliding member 7 is mounted to the lower end portion 5D of the supporting arm 5, and the arc slot 6 is formed in the body portion 8A of the step bracket 8. However, in the first and second embodiments, the arc sliding member 7 is mounted to the body portion 8A of the step bracket 8, and the arc slot 6 is formed in the lower end portion 5D of the supporting arm 5.

It should be appreciated by those having ordinary skill in the related art that the third embodiment of the device of the present invention can have any suitable shape, size, and structure and structural relationship with each of the vehicle body and vehicle step 9. More specifically, it should be so appreciated that the mounting bracket 1 can be fixed to the vehicle body in any suitable manner and the extension portion 8C of the step bracket 8 can be fixed to the vehicle step 9 in any suitable manner. It should be so appreciated also that each of the mounting bracket 1, step bracket 8, arc sliding member 7, driving arm 4, and supporting arm 5 can have any suitable shape, size, and structure and structural relationship with each other. It should be so appreciated also that each of the arc slot 6, groove 8B, center hole 8D and circular center of the columnar structure 8A, and curvature center 11 of the arc slot 6 can have any suitable shape and size and structural relationship with the device. It should be so appreciated also that the length differential between the arc slot 6 and arc sliding member 7 can be any suitable length. It should be so appreciated also that the curvature radius of the arc slot 6 may be any suitable length. It should be so appreciated also that when the vehicle step 9 is extended, the angle "α" between imaginary lines "$L_1$" and "$L_2$" can be any suitable angle.

Figure 7:
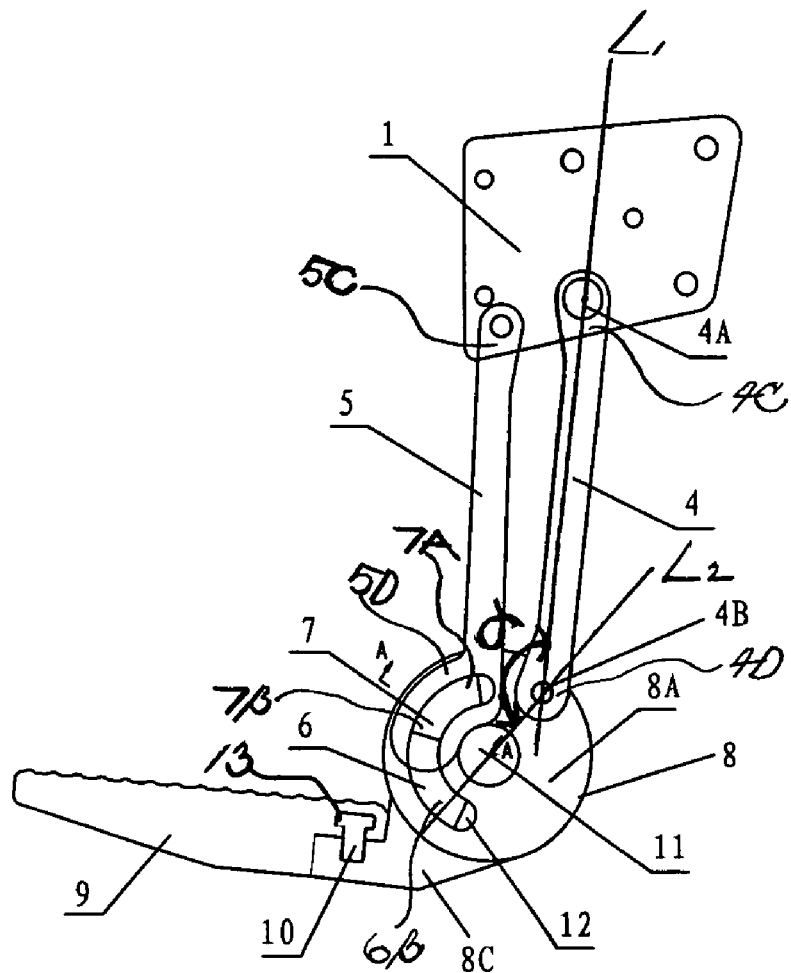
FIG. 7 is a schematic side view of a fourth embodiment of the extending and retracting device for a vehicle step of the present invention shown disposed in an extended position.
Figure 8:
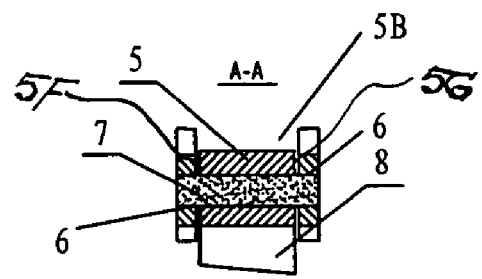
FIG. 8 is a sectional view of a part of the fourth embodiment of the extending and retracting device for a vehicle step of the present invention taken along line "A-A" of FIG. 7.
Figure 12:
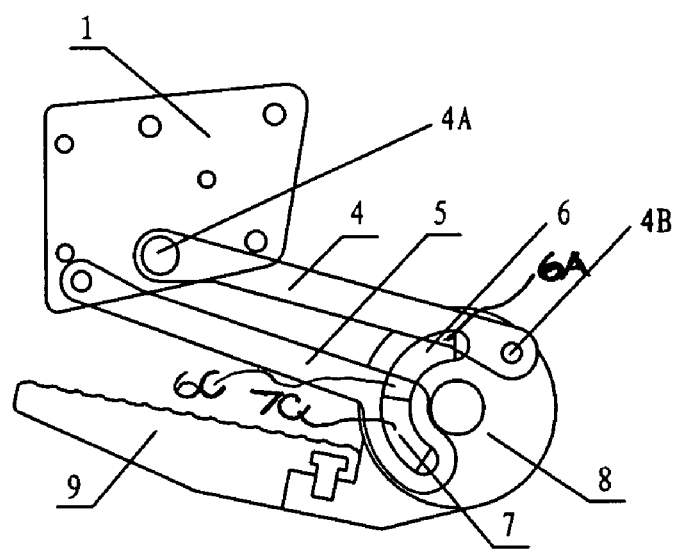
FIG. 12 is a schematic side view of the fourth embodiment of the extending and retracting device for a vehicle step of the present invention illustrated in FIG. 7 shown disposed in a retracted position.

With reference to FIGS. 7-8 and 12, the fourth embodiment of the device of the present invention will now be described. In general, this embodiment of the device includes a mounting bracket 1, a step bracket 8, an arc sliding member 7, a driving arm 4, and a supporting arm 5.

More specifically, the step bracket 8 includes a body portion 8A and an extension portion 8C extending from a lower part of the body portion 8A, and a vehicle step 9 is connected to and mounted on the extension portion 8C. The body portion 8A of the step bracket 8 is formed with an arc slot 6.

The driving arm 4 defines a pair of ends 4C, 4D of the driving arm 4 pivotally connected to the mounting bracket 1 and the body portion 8A of the step bracket 8, respectively. An upper end portion 5C of the supporting arm 5 is pivotally connected to the mounting bracket 1.

The arc sliding member 7 is mounted to a lower end portion 5D of the supporting arm 5 and fitted into the arc slot 6 so as to be slidable in the arc slot 6 such that the lower end portion 5D of the supporting arm 5 is slidably connected to the body portion 8A of the step bracket 8.

As shown in FIGS. 7 and 8, the lower end portion 5D of the supporting arm 5 is formed as an arc structure 5D, which is formed with a substantially fan-shaped through-hole (not shown) near a circular center of the arc structure 5D. A substantially U-shaped groove 5B is formed in the lower end portion 5D of the supporting arm 5.

As shown in FIG. 8, a part of the body portion 8A of the step bracket 8 is located in the groove 5B. The arc sliding member 7 passes through the arc slot 6 formed in the body portion 8A of the step bracket 8, and a pair of ends 7A, 7B of the arc sliding member 7 are fixed in a respective pair of side walls 5F, 5G of the groove 5. Therefore, the supporting arm 5 and the step bracket 8 are slidably connected to each other.

As shown in FIGS. 7 and 8, the arc slot 6 extends through the body portion 8A of the step bracket 8. The body portion 8A is formed as a columnar structure 8A. A curvature center 11 of the arc slot 6 coincides with a circular center of the columnar structure 8A.

In particular, the arc sliding member 7 may be formed as a sliding block 7. However, those having ordinary skill in the related art should appreciate that the arc sliding member 7 may be formed as, for example, a plurality of columnar bodies arranged in an arc array 7. The ends 7A, 7B of the arc sliding block 7 are fixed in the respective side walls 5F, 5G of the groove 5B, and the arc sliding block 7 passes through the arc slot 6 in the step bracket 8. The arc of the arc slot 6 is longer than that of the arc sliding member 7 so that the arc sliding member 7 can slide in the arc slot 6 in a predetermined range.

The arc slot 6 defines an upper end 6A, shown in FIG. 12, and a lower end 6B, shown in FIG. 7, of the arc slot 6. In order to reduce impact of the arc sliding member 7 on the arc slot 6, a curvature radius of each end 6A, 6B of the arc slot 6 is smaller than that of an intermediate portion 6C of the arc slot 6 defined between the upper and lower ends 6A, 6B. However, those having ordinary skill in the related art should appreciate that the curvature radius of the arc slot 6 may be substantially uniform.

The extension portion 8C of the step bracket 8 is formed with a step groove 10, and a vehicle step 9 is placed on and covers the step groove 10 so that the vehicle step 9 is fixed to the extension portion 8C by a fastener, such as a screw 13, thereby forming the device of the present invention. When the vehicle step 9 and, thus, device are in an extended position, the arc sliding member 7 is located in the arc slot 6 substantially at or adjacent to the upper end 6A of the arc slot 6, as shown in FIG. 7. When the vehicle step 9 and, thus, device are in a retracted position, the arc sliding member 7 is located in the arc slot 6 substantially at or adjacent to the lower end 6B of the arc slot 6, as shown in FIG. 12.

As shown in FIG. 7, the arc slot 6 and the curvature center 11 of the arc slot 6 are located to the same side (shown to the left side in FIG. 7) of imaginary line "$L_1$" connecting with each other a pair of pivot points of the respective pivot shafts 4A, 4B of said driving arm 4. When the vehicle step 9 is extended, the angle "α" between imaginary line "$L_1$" and imaginary line "$L_2$" connecting the pivot point of the pivot shaft 4B with the curvature center 11 of the arc slot 6 may be within the range of 150° to 175°, such as 165°.

The fourth embodiment of the device of the present invention differs from the third embodiment of the device of the present invention in the following main aspects. In the fourth embodiment, the lower end portion 5D of the supporting arm 5 is formed with the groove 5B, a part of the body portion 8A of the step bracket 8 is located in the groove 5B, the arc sliding member 7 passes through the arc slot 6 formed in the step bracket 8, and the ends 7A, 7B of the arc sliding member 7 are fixed in the respective side walls 5F, 5G of the groove 5B. However, in the third embodiment, the body portion 8A of the step bracket 8 is formed with the groove 8B, the lower end portion 5D of the supporting arm 5 is located in the groove 8B, the intermediate portion 7C of the arc sliding member 7 is fixed in the lower end portion 5D of the supporting arm 5, and the ends 7A, 7B of the arc sliding member 7 are extended into the respective arc slots 6 formed in the corresponding side walls 8E, 8F of the groove 8B.

It should be appreciated by those having ordinary skill in the related art that the fourth embodiment of the device of the present invention can have any suitable shape, size, and structure and structural relationship with each of the vehicle body and vehicle step 9. More specifically, it should be so appreciated that the mounting bracket 1 can be fixed to the vehicle body in any suitable manner and the extension portion 8C of the step bracket 8 can be fixed to the vehicle step 9 in any suitable manner. It should be so appreciated also that each of the mounting bracket 1, step bracket 8, arc sliding member 7, driving arm 4, and supporting arm 5 can have any suitable shape, size, and structure and structural relationship with each other. It should be so appreciated also that each of the arc slot 6, groove 5B, circular center of the columnar structure 8A, curvature center 11 of the arc slot 6, and through-hole and circular center of the arc structure 5D can have any suitable shape and size and structural relationship with the device. It should be so appreciated also that the length differential between the arc slot 6 and arc sliding member 7 can be any suitable length. It should be so appreciated also that the curvature radius of the arc slot 6 may be any suitable length. It should be so appreciated also that when the vehicle step 9 is extended, the angle "α" between imaginary lines "$L_1$" and "$L_2$" can be any suitable angle.

In operation, each vehicle step 9 is provided with a pair of devices of the present invention disposed at a respective pair of sides of the vehicle step 9. A transmission shaft (not shown) located at the upper end 4C of the driving arm 4 of one device is connected to a motor 3 via a transmission mechanism 2, as shown in FIGS. 1 and 5.

Before operation, when the vehicle step 9 needs to be extended, the motor 3 drives the upper end 4C of the driving arm 4 via the transmission mechanism 2 to rotate clockwise. FIGS. 9-12 show the retracted position (initial state) of the vehicle step 9. The transmission shaft drives the driving arm 4 and the supporting arm 5 to rotate clockwise, and the arc sliding member 7 slides substantially rightward and downward along the arc slot 6 so that the vehicle step 9 moves substantially leftward and downward. When the arc sliding member 7 slides to the limit position in the arc slot 6, the clockwise movement of the driving arm 4 and the supporting arm 5 are completed, and the driving arm 4 and the supporting arm 5 are disposed substantially perpendicular to the ground. At this time, the vehicle step 9 is located at a lower left side of the mounting bracket 1 and in the extended position, as shown in FIGS. 1, 3, 5 and 7. Thus, the device finishes a process of its transforming itself from the retracted position to the extended position.

After operation, when the vehicle step 9 needs to be retracted, the motor 3 rotates reversely and drives the transmission shaft at the upper end 4C of the driving arm 4 to rotate counterclockwise. FIGS. 1, 3, 5, and 7 show the extended position of the vehicle step 9. The transmission shaft drives the driving arm 4 and the supporting arm 5 to rotate counterclockwise so that the arc sliding member 7 slides substantially upward and leftward in the arc slot 6 and the vehicle step 9 moves substantially upward and rightward. When the arc sliding member 7 slides to the limit position along the arc slot 6, the counterclockwise movement of the driving arm 4 and the supporting arm 5 are completed, and the driving arm 4 and the supporting arm 5 are disposed substantially parallel to the ground. At this time, the vehicle step 9 is located substantially at a right lower side of the mounting bracket 1, close to the mounting bracket 1 and in retracted position, as shown in FIGS. 9-12. Thus, the device finishes a process of its transforming itself from the extended position to the retracted position.

The device of the present invention provides increased reliability and reduced cost and structural complexity. Also, the device distributes stress evenly, and the buffering mechanism is structurally simple. And, the arc sliding member 7 and arc slot 6 are used to replace the four-link mechanism of the extending and retracting device of the retractable vehicle-step apparatus of the related art. Furthermore, the end portions 6A, 6B of the arc slot 6 limit positions and buffer impact of the arc sliding member 7. In addition, when the device and, thus, vehicle step 9 are extended and a passenger steps on the extended vehicle step 9, the device is in a balanced stage by an internal self-locking force of the device. Moreover, use of the arc sliding member 7 and arc slot 6 can eliminate stress concentration so that useful life of the device is long. The device is light and more aesthetically pleasing as well.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An extending and retracting device for a vehicle step comprising:
    a mounting bracket adapted to be fixed to a body of a vehicle;
    a step bracket formed with a substantially U-shaped groove therein defining a pair of side walls of said groove;
    an arc sliding member fixed to said step bracket, made in the form of an arc sliding block, and defining a pair of ends of said arc sliding member fixed in respective said pair of side walls of said groove;
    a driving arm defining a pair of ends thereof pivotally connected to respective said mounting bracket and said step bracket; and
    a supporting arm defining an upper end portion thereof pivotally connected to said mounting bracket and a lower end portion of said supporting arm located in said groove of said step bracket and defining at least one arc slot of said lower end portion, wherein said arc sliding member is adapted to pass through and fit into said arc slot so as to be slidable in said arc slot such that said lower end portion of said supporting arm is slidably connected to said step bracket.

2. An extending and retracting device for a vehicle step as set forth in claim 1, wherein said arc sliding member is made in the form of a plurality of columnar bodies arranged in an arc array, said step bracket is formed with a substantially U-shaped groove defining a pair of side walls thereof, said lower end portion of said supporting arm is located in said groove, and said arc sliding member defines a pair of ends fixed in respective said pair of side walls of said groove such that said arc sliding member passes through and is slidably fitted into said arc slot.

3. An extending and retracting device for a vehicle step as set forth in claim 1, wherein said step bracket includes a body portion and an extension portion formed with a step groove for fixing the vehicle step to said step bracket, said arc sliding member is located in said arc slot substantially at or adjacent to a lower end of said arc slot when said device is in an extended position, and said arc sliding member is located in said arc slot substantially at or adjacent to an upper end of said arc slot when said device is in a retracted position.

4. An extending and retracting device for a vehicle step as set forth in claim 1, wherein said arc slot defines a pair of ends thereof and a curvature radius at said pair of ends of said arc slot is smaller than that at an intermediate portion of said arc slot.

5. An extending and retracting device for a vehicle step as set forth in claim 1, wherein said arc slot defines a pair of ends thereof, a substantially uniform curvature radius, and at least one buffering pad disposed at a respective one of said pair of ends of said arc slot in order to reduce impact of said arc sliding member on said arc slot.

6. An extending and retracting device for a vehicle step as set forth in claim 1, wherein said arc slot defines a curvature center thereof and said arc slot and curvature center are located to the same side of an imaginary line connecting with each other a pair of pivot points defined by respective said pair of ends of said driving arm.

7. An extending and retracting device for a vehicle step as set forth in claim 1, wherein said lower end portion of said supporting arm is made in the form of an arc structure and defines a curvature center substantially coinciding with a curvature center defined by said arc slot.

8. An extending and retracting device for a vehicle step as set forth in claim 7, wherein said step bracket includes a body portion and an extension portion formed with a step groove therein for fixing the vehicle step to said step bracket, said body portion is made in the form of a columnar structure defining a substantial center of circle thereof and sized to be adapted to match said arc structure of said supporting arm, and said arc slot defines a curvature center thereof substantially coinciding with said center of circle of said columnar structure.

\* \* \* \* \*